United States Patent Office 3,556,611
Patented Jan. 19, 1971

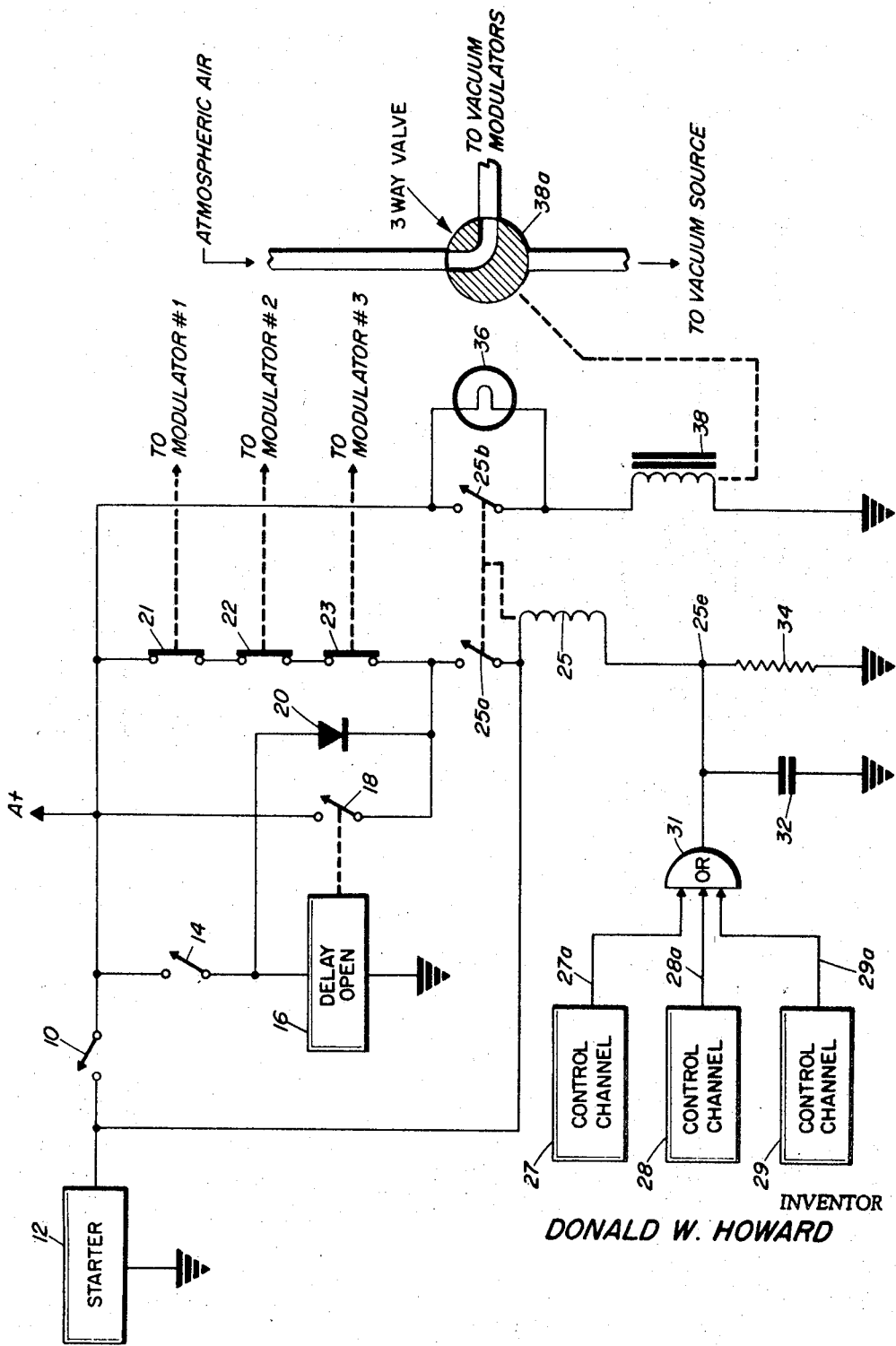

3,556,611
FAIL-SAFE CIRCUIT FOR MULTIPLE CHANNEL VACUUM MODULATED ADAPTIVE BRAKING SYSTEM
Donald W. Howard, South Bend, Ind., assignor to The Bendix Corporation, a corporation of Delaware
Filed Dec. 20, 1968, Ser. No. 785,664
Int. Cl. B60t 8/00
U.S. Cl. 303—21          8 Claims

ABSTRACT OF THE DISCLOSURE

A fail-safe circuit which is suitably used in an adaptive braking system. Normally, in known adaptive braking systems a control signal is applied to a brake pressure modulator which is thereby caused to optimize the braking characteristics of a wheeled vehicle during the time the vehicle is being braked. In the present invention a normally closed modulator limit switch is provided which opens whenever the modulator attempts to control the vehicle braking characteristics. A normally open brake switch is connected across the modulator switch thus shunting this latter switch whenever the brake pedal is depressed. A latching circuit which is latched when the vehicle starter is energized and which supplies power to the modulators whenever latched, is serially connected to the shunted combination of brake switch and modulator limit switch. Additionally the control signal is sampled at the low voltage end of the latching circuit by an RC circuit. If the duration of the error signal is excessive the voltage at the low voltage end of the latching circuit, that is, the voltage across the RC circuit, will build to a level to unlatch the latching circuit. When the latching circuit is unlatched, whether by the opening of the limit switch while the brake switch is open or by voltage across the RC circuit, power is removed from the modulator which will thus return to a normal position and restore normal vehicle braking.

---

The fail-safe circuit disclosed herein is suitable for use in an adaptive braking system having at least one brake pressure modulator of the type disclosed in a patent application for "Automobile Anti-Skid Control" by Michael Slavin et al., application Ser. No. 712,672, filed Mar. 13, 1968 and which is assigned to the assignee in the present application.

This invention relates to fail-safe circuits for use in automotive adaptive braking systems and, more particularly to fail-safe circuits and adaptive braking systems of the type which use a brake pressure modulator having movable elements to control wheel brake pressure. One type of pressure modulator found to be practical and in wide commercial usage is a vacuum powered modulator deriving vacuum from the engine manifold. The following discussion will show in particular how this invention is incorporated into an adaptive braking system having vacuum powered brake pressure modulator. However, it should be understood and it will become obvious that this invention is applicable for use with any adaptive braking system wherein a control signal is used to control braking characteristics.

There was described in the aforementioned patent application Ser. No. 712,672, an adaptive braking system which included at least one control channel wherein control signals were generated in response to changing wheel velocity as the vehicle was braked. These control signals were then applied to a means for controlling the braking pressure at the controlled wheels so that braking characteristics of the vehicle are optimized. One means responsive to these control signals for controlling the wheel braking pressure as disclosed in the aforementioned patent application comprises a vacuum powered pressure modulator which includes, briefly, a hermetically sealed chamber divided into two sections by a leaky, flexible diaphragm which is urged into a first position by a biasing spring. A displacement rod, driven by the diaphragm and when in said first position, causes a hydraulic line valve to open thus allowing free communication between the vehicle master cylinder and the wheel cylinder. Vacuum is continually drawn from one side of the flexible diaphragm, which it will be remembered is leaky, so that pressure on both sides of the diaphragm is equalized and the diaphragm normally remains in its spring biased or first position. In response to a control channel control signal, however, a solenoid valve admits atmospheric air to the other side of the diaphragm thus causing the diaphragm and its attached displacement rod to be forced out of its first position and towards a second position. As the displacement rod moves toward the second position the hydraulic line valve is first closed thus cutting off communication between the master cylinder and the wheel cylinder and then the hydraulic fluid remaining in the wheel cylinder is displaced so as to attenuate the braking force. It should thus be obvious that should the solenoid valve admitting air to the vacuum powered modulator fail while in the open position or if the hermetic chamber became leaky so that atmospheric air is inadvertently admitted into the vacuum modulator, it is possible that the modulator diaphragm will be permanently forced into its second position thus preventing the vehicle from being braked.

In the aforementioned mode of failure it is advantageous that the modulator be immediately disabled and the vehicle braking system be returned to the normal, manual mode of operation. However, another mode of failure may occur wherein the modulator should not be disabled until a predetermined time period after the diaphragm has been displaced from its first position. In this failure mode, the control channel fails during a braked stop and the control signal remains on for an extended period of time. Under these conditions, the modulator diaphragm and displacement rod will remain in the second position for an extended period of time during which time vehicle braking control is lost.

Accordingly, a fail-safe circuit has been devised for use in adaptive braking systems of the type wherein a control signal is used to control braking pressure. A normally open modulator limit switch is installed in each modulator with the switch being closed whenever the modulator diaphragm is in its first position. If the adaptive braking system includes more than one modulator, the modulator limit switches are serially connected. A normally open brake switch shunts the modulator limit switches when the brake pedal is depressed as is the case when the vehicle is braked. A latching circuit which is latched when the engine starter is energized receives power either from the modulator limit switches or from the brake switch. If at any time one of the modulator limit switches opens while the brake switch is open as would occur if a fault occurred in a modulator, the latching circuit unlatches and disconnects the modulator from its power source. Thus, at any time a modulator diaphragm moves out of its first position, which position allows free communication between the master cylinder and the wheel cylinder, and the brake pedal has not been depressed, the fail-safe circuit acts to disable the modulator and return it to its first position. It should be apparent that the only time a modulator limit switch and the brake switch can be opened at the same time is when a fault has occurred, since the control channel generated control signal which causes the modulator to operate thus opening the limit switch can be generated only while the vehicle is being braked, that is, while the brake pedal is depressed. A time delay is provided to prevent unlatching of the latching circuit during the short period of time between the releasing of the brake pedal and the returning of the modulator diaphragm to its first position.

For that failure mode wherein the control channel improperly generates a control signal over a extended period of time the following means are provided for disabling the adaptive braking system and returning the vehicle braking system to the normal, manual mode of operation. An RC time constant circuit is connected to the low voltage end of the latching circuit and receives charging current from the control signal. During the time that the control signal is generated, the voltage at the low voltage end of the latching circuit rises. Should the control signal remain on longer than a predetermined time period, which time period is determined by the time constant of the RC circuit, the voltage at the low voltage end of the latching relay will have risen sufficiently to cause the latching circuit to unlatch, thus, as before, disconnecting the power source from the modulator so as to cause the modulator to return to its first position. As before this disables the adaptive braking circuit and returns the vehicle braking system to the normal, manual mode of operation.

It is thus an object of this invention to provide a fail-safe circuit for an adaptive braking system which uses control signal controlled pressure modulators.

Another object of this invention is to provide a fail-safe circuit of the type described which will restore normal braking to the vehicle should the adaptive braking system fail.

One other object of this invention is to provide a fail-safe circuit which is compatible with known adaptive braking systems.

One other object of this invention is to provide a fail-safe circuit of the type described for use in adaptive braking systems which have multiple pressure modulators.

A still further object of this invention is to provide a fail-safe circuit which will restore normal, manual braking to a vehicle should the pressure modulator fail.

One more object of this invention is to provide a fail-safe circuit of the type described which will restore normal manual braking to a vehicle should an adaptive braking control channel fail.

These and other objects of this invention will become apparent to one skilled in the art upon a reading and understanding of the following disclosure.

The figure is a functional schematic of the invention.

Referring to the figure, there is seen an adaptive braking control system comprised generally of three control channels 27, 28 and 29. These control channels are suitably installed on an automobile, truck or the like. It should be understood that the control signals issuing from the control channels on lines 27a, 28a, and 29a represent the control signals which act through a brake pressure modulator to control wheel braking characteristic as previously described in this application and in application Ser. No. 712,672 and that each control signal is applied to an individual modulator in addition to being applied collectively to OR gate 31 as shown. Although three control channels are shown in this embodiment of the invention it should be understood and will be readily apparent from the description of the invention that the addition of more or the deletion of control channels will be of no effect in the operation of the invention. The invention will be described as embodied in an adaptive braking system using vacuum powered pressure modulators; however, it should be understood that the invention may be practiced in systems using any type of modulator having control signal responsive movable elements for controlling brake pressure, it being merely necessary to gang the limit switch to the movable elements in any manner well within the ken of the skilled mechanic.

Upon starting the vehicle engine by the momentary closing of ignition switch 10 which energizes engine starter motor 12 the vehicle operator also momentarily energizes through switch 10 relay coil 25, thus causing relay contacts 25a and 25b to close. Once the engine has started and switch 10 is opened, relay coil 25 remains latched through the modulator limit switches 21 and 23 and relay contact 25a. The modulator limit switches 21 to 23 are ganged to and held in a closed position whenever the diaphragms of modulators 1, 2, and 3, respectively, are individually in their first position, the aforementioned modulators being controlled by the control channels 27, 28 and 29, respectively.

With relay coil 25 energized, relay contact 25b is also closed thus energizing the three way solenoid valve comprised of coil 38 and armature 38a so that the pressure modulators are now connected to a vacuum source, suitably the engine manifold. However, since the vehicle is not being braked control channels 27 to 29 are not generating control signals and the vacuum modulator diaphragms and control rods remain in their first position as previously braked and limit switches 21 to 23 remain closed.

During a braked stop when the operator depresses the brake pedal brake switch 14 closes so that power is applied to relay coil 25 not only through the modulator limit switches 21 to 23 but also through brake switch 14 and diode 20 as long as the brake pedal remains depressed. Additionally, the closing of switch 14 energizes time delay 16 thereby also closing thereto ganged switch 18 to establish a third power source route for relay coil 25. If, during the braked stop, one or more of the control channels 27 to 29 generates a control signal which causes its vacuum powered modulator diaphragm to be displaced from its first position, one or more of the limit switches 21 to 23 will open. However, as long as brake switch 14 is depressed, coil 25 will remain latched and energized through either one of switches 14 or 18 so that relay contacts 25a and 25b remain closed, coil 38 remains energized and armature 38a continues to connect the vacuum source to the modulators. When the brake pedal is released brake switch 14 of course opens. If at that time one of the limit switches 21 to 23 is open, power will still be supplied to coil 25 through switch 18 which under the influence of time delay 16 remains open during the short period of time required for any of the modulated diaphragms to return to their first position after completion of braking. Thus, if the adaptive braking system is working properly, all of the limit switches 21 to 23 will be closed by the return of the modulator diaphragms before time delay switch 18 opens.

Assume now that during a brake stop a fault occurs in one of the control channels whereby the control signal is generated for an abnormally long time so that its associated modulator no longer acts to control the braking pressure at its wheel but rather acts to completely isolate the wheel from the braking system. It can be seen that the control signal passes through OR gate 31 and charges capacitor 32. After a predetermined time period, set by the time constant of the time delay circuit comprised of capacitor 32 and resistor 34, the voltage at the low voltage end of the relay coil 25, 25e, will have risen sufficiently to deenergize this coil thus causing contact 25a to open and unlatch the relay. Additionally, contact 25b will open thus deenergizing solenoid 38 and returning armature 38a into its normal, unenergized position, introducing atmospheric air into the modulators thus forcing the modulator diaphragms and associated displacement rods back into their first position as has previously been discussed. Warning lamp 36, suitably mounted on the vehicle dashboard, will now light since its resistance is very large compared to the resistance of solenoid coil 38 and most of the supply voltage will appear across the lamp. It should be realized that although the failure mode just described would more probably occur during a braked stop it is also possible that the identical failure mode may occur at any time even while the vehicle is not being braked. It should be obvious that in the latter case relay coil 25 will be unlatched in the same manner as the former case, thus disabling the adaptive braking system and lighting warning lamp 36.

Assume now that a different mode of failure occurs; namely, assume that one or the other of the modulated diaphragms moves out of its first position when the brake pedal is not depressed or after the brake pedal has been released and the delay period of time delay 16 has elapsed. In this case switches 14 and 18 are open and the opening of any one of the limit switches 21 to 23, which, of course, occurs when its associated diaphragm moved immediately unlatches coil 25. As described before, the adaptive braking system is deactivated and warning light 36 is energized.

Although I have taught what I consider to be the preferred embodiment of my invention, it is obvious that certain changes and modifications can be made by one skilled in the art without departing therefrom. I therefore intend to claim as my invention all such changes and modifications which fall within the true spirit and scope of the appended claims.

The invention claimed is:

1. In a vehicle having a brake switch, operable by a brake pedal, a starter switch and an adaptive braking system comprising at least one control channel including one braking pressure modulator in each said channel, said modulator comprising mechanical means responsive to a control channel generated control signal for attenuating braking pressure, an improvement providing fail-safe operation of said braking system comprising:

switching means responsive to movement of any said mechanical means and connected electrically across said brake switch;
a voltage source;
latching means including latching contact means and a latching contact means actuator serially connected with said switching means across said voltage source; and, means energized through said latching contacts means for disabling said modulator.

2. The improvement recited in claim 1 wherein said latching contacts comprise first and second switches actuated by said latching contact means actuator, said first switch being serially connected with said switching means and said latching contact means actuator across said voltage source and said second switch being serially connected with said modulator disabling means across said voltage source.

3. The improvement recited in claim 2 with additionally an indicator connected across said second switch.

4. The improvement recited in claim 2 wherein said latching contact means actuator includes a low voltage end and with additionally a charging circuit connected serially with said latch contact means actuator, said switching means and said first switch across said voltage source, one end of said charging circuit being connected to said low voltage end and said control signals being applied to said low voltage end.

5. The improvement recited in claim 2 with additionally:
third switch contact connected across said brake switch and, time delay means energized by said brake switch for urging said third switch contacts to a first position during a predetermined time delay period after said brake switch opens.

6. The improvement recited in claim 5 wherein said latching contact means actuator includes a low voltage end and with additionally a charging circuit connected serially with said latch contact means actuator, said switching means and said first switch across said voltage source, one end of said charging circuit being connected to said low voltage end and said control signals being applied to said low voltage end.

7. The improvement recited in claim 6 wherein said charging circuit comprises a parallel RC circuit.

8. The improvement recited in claim 7 wherein said latching contact means actuator and said first and second switches comprise a relay.

References Cited
UNITED STATES PATENTS

| | | | |
|---|---|---|---|
| 3,401,983 | 9/1968 | Reid | 303—21(A4) |
| 3,433,535 | 3/1969 | Horvath | 303—21(BB) |

DUANE A. REGER, Primary Examiner

U.S. Cl. X.R.

303—20